United States Patent [19]

Harris

[11] Patent Number: 5,212,943
[45] Date of Patent: May 25, 1993

[54] REDUCED THERMAL STRESS TURBINE STARTING STRATEGY

[75] Inventor: James J. Harris, San Diego, Calif.

[73] Assignee: Sundstrand Corporation, Rockford, Ill.

[21] Appl. No.: 772,834

[22] Filed: Oct. 8, 1991

[51] Int. Cl.⁵ .............................................. F02C 9/28
[52] U.S. Cl. .............................. 60/39.141; 60/39.281
[58] Field of Search .................... 60/39.141, 39.281; 364/431.02

[56] References Cited

U.S. PATENT DOCUMENTS

| | | | |
|---|---|---|---|
| 4,044,551 | 8/1977 | Nelson et al. | 60/39.141 |
| 4,044,554 | 8/1977 | West | 60/39.28 T |
| 4,274,255 | 6/1981 | Pollak | 60/39.14 R |
| 4,281,509 | 8/1981 | Grone | 60/39.02 |
| 4,337,615 | 7/1982 | LaCroix | 60/39.141 |
| 4,344,141 | 8/1982 | Yates | 60/39.281 |
| 4,350,008 | 9/1982 | Zickwolf, Jr. | 60/39.14 R |
| 4,378,673 | 4/1983 | Abo et al. | 60/39.281 |
| 4,464,895 | 8/1984 | Morrison et al. | 60/39.141 |
| 4,532,763 | 8/1985 | Pisano | 60/39.281 |
| 4,651,518 | 3/1987 | McLaughlin et al. | 60/39.02 |
| 4,783,957 | 11/1988 | Harris | 60/39.281 |

*Primary Examiner*—Louis J. Casaregola
*Attorney, Agent, or Firm*—Antonelli, Terry, Stout & Kraus

[57] ABSTRACT

A gas turbine engine starting strategy is disclosed which minimizes thermal stress utilizing a total fuel demand based on summing two components. The first component is a prescheduled quantity of fuel near the low limit of predicted fuel requirements as a function of turbine spool rotational speed. The second component is dynamically determined based on a comparison of turbine spool rotational acceleration with stored rotational acceleration values at different turbine spool rotational speeds.

12 Claims, 1 Drawing Sheet

REDUCED THERMAL STRESS TURBINE STARTING STRATEGY

TECHNICAL FIELD

The present invention relates generally to an apparatus and method for metering fuel to gas turbine engines during start-up so thermal induced stress is minimized. More specifically, the invention relates to a strategy relating turbine spool rotational speed and acceleration to amounts of metered fuel so reliable but not unduly thermally stressing gas turbine engine start-ups are achieved.

BACKGROUND ART

Proper metering of fuel to a gas turbine engine during start-up, i.e., from ignition of fuel in combustion chambers to the time the turbine spool achieves normal idle rotational speed, is a difficult and demanding task. If insufficient fuel is metered and burned, necessary torque will not be applied to the turbine spool for achieving normal idle rotational speeds. In fact, fuel combustion can become so insufficient that combustion itself cannot be sustained and flameout will occur resulting in unburned fuel flowing on previously heated gas turbine engine components causing vaporization and a risk of explosive reignition. The opposite situation results with excess metered fuel which raises temperatures of gas turbine engine components too rapidly and to excessive levels. Both a rate of temperature increase and excessive quantities of heat cause exorbitant thermal stress reducing gas turbine engine lifetime and possibly risking nonpredicted component failure to include fracture. Further, excessive heat and rate of temperature increase can stall gas turbine engine compressors.

Depending on turbine spool rotational speeds, the acceptable range in amounts of metered fuel available during gas turbine engine start-up can be quite limited. The type of fuel, ambient temperature and ambient pressure are among many variables which determine the amount of metered fuel required for efficient and reliable gas turbine engine start-up with minimized thermal stress. Therefore, prescheduling metering of fuel for gas turbine engine start-up without dynamic adjustment for unpredictable influencing variables cannot assure reliable start-ups with minimized thermal stress.

A prior known strategy for scheduling fuel metering is to begin supplying the maximum potentially necessary quantity of fuel to combustion chambers, and then monitor differences between measured exhaust gas temperature (EGT) and predetermined EGT limits so that the amount of metered fuel can be reduced as measured EGT reaches the predetermined EGT limits. This gas turbine engine start-up strategy, known as temperature topping, risks excessive rates of rise in EGT and greater thermal stresses on gas turbine engine components than are absolutely necessary for assuring reliable start-ups.

An example of a rich scheduled fuel supply strategy is provided in U.S. Pat. No. 4,350,008 issued to Zickwolf where scheduling increasing rates of fuel flow during gas turbine engine start-up is described as a function of rotor speed and ambient temperature. A gas turbine engine is cranked until sufficient air flow is available for light-off, at which time fuel is provided at a fixed flow rate with an ignitor in operation to initiate combustion. When ignition occurs, the temperature rise that occurs in the burner is detected by a temperature sensor and fuel flow is increased in accordance with a rate of change schedule that is a function of rotor speed and ambient temperature. A temperature limiting control compares measured turbine exhaust temperature with a reference derived from both rotor speed and ambient temperature. If the measured turbine exhaust temperature exceeds the compared reference value then the rate of fuel change schedule is overridden to reduce fuel flow when overtemperature occurs. Essentially, a rich supply of fuel is provided until a reference temperature is exceeded.

Another fuel control system for use during gas turbine engine start-up is described in U.S. Pat. No. 4,281,509 issued to LaGrone. A fuel control system has a speed governor responsive to engine speed so that fuel flow is variably delivered to the engine with a governor controlled feedback loop arrangement maintaining engine speed. To accelerate the engine along a required-to-run line, the governor speed set point is changed gradually at a rate which is somewhat slower than the corresponding acceleration capability of the engine when accelerating along its required-to-run line. Such scheduling of the governor set speed point is accomplished by a timing mechanism which is responsive to elapsed time for the engine start-up period. Thus, adjustment of the timing mechanism extends the time for gas turbine engine acceleration. Such time extension results in permitting mechanical resonances at intermediate start-up speeds to build up which unavoidably reduce gas turbine engine lifetime. This situation is unavoidable because in selecting a fixed elapsed start-up time, the highest acceleration rate must be lower than optimum acceleration rates to avoid having excess fuel provided and thereby cause compressor instability and possibly even compressor stall.

U.S. Pat. No. 4,274,255 issued to Pollak, describes another closed loop fuel control system for starting gas turbine engines. Fuel flow to a gas turbine engine is adjusted as a function of difference between predetermined torque and measured torque so as to control fuel metering with a predetermined start-up schedule. The predetermined schedule, here torque, must be set low enough to assure the gas turbine engine can produce the scheduled start-up value during the most adverse conditions, which necessarily extends time for start-up.

DISCLOSURE OF THE INVENTION

The present invention provides a dynamic gas turbine engine start-up strategy which subjects gas turbine engine components to reduced thermal stress.

The present invention provides metering of adequate amounts of fuel to gas turbine engines to assure reliable starting without reducing gas turbine engine lifetime.

The fuel metering system of the present invention utilizes a total fuel demand concept based on the sum of two components. The first component provides a predetermined low limit amount of fuel. This low limit amount of fuel is sufficient for sustaining gas turbine engine start-up. The first component is provided to a fuel controller as a predetermined function of turbine spool rotational speed to provide the minimum required fuel for achieving acceleration at measured turbine spool rotational speeds while avoiding flameout. Threshold minimum rotational acceleration values are used for different rotational speeds. The second component is a dynamically determined correction term. During initiation of gas turbine engine start-up, the correction term has an initial value of zero. But if comparison of turbine spool rotational accelerations predetermined as a function of rotational speeds are higher than measured rotational accelerations, the correction term is increased by a predetermined value. This initial value for the correction term is then provided to the fuel controller for increasing amounts of metered fuel. Additional step increases in the value of the correction term are utilized if the measured turbine spool rotational acceleration continues to be below predetermined rotational acceleration. These additional step increases in the value of the correction term continue up to a predetermined maximum value which is also a function of turbine spool rotational speed.

The present invention provides metering of fuel to gas turbine engines during start-up without using exhaust gas temperature (EGT), e.g., for emergency gas turbine engine start-up with failed EGT circuits, or in a simple system without EGT monitoring.

A second embodiment of the invention utilizes exhaust gas temperature (EGT) monitoring circuits in combination with the total fuel demand strategy of the present invention. The maximum value for the correction term in this embodiment, however, is limited using monitored EGT. This embodiment does not use temperature topping because temperature topping involves deliberately supplying near the maximum fuel.

A third embodiment of the present invention can also reduce the dynamically determined values for the correction term. This embodiment utilizes a comparison of measured turbine spool rotational acceleration with not only predetermined rotational accelerations for assuring minimal rotational acceleration, but also includes a comparison with predetermined maximum rotational acceleration for protection against excessive rotational acceleration.

The second embodiment utilizing EGT is generally more useful than the third embodiment utilizing excess acceleration.

BEST MODE FOR CARRYING OUT THE INVENTION

Figure 1:
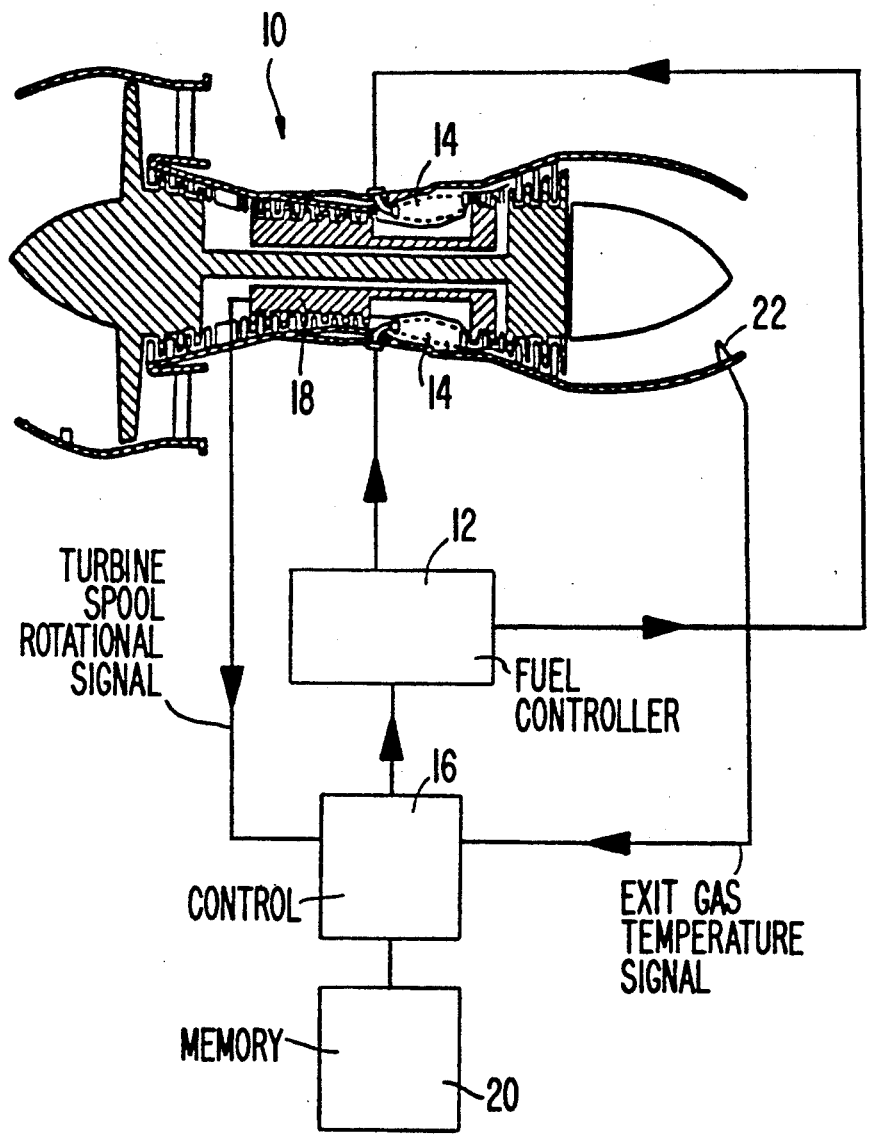
FIG. 1 is a schematic illustration of a gas turbine engine showing a system for control of adequate fuel supply to the gas turbine engine for proper turbine start-up in conformity with the present invention.

A schematic drawing for a controller of the fuel supply to a gas turbine engine, according to the present invention, is shown in FIG. 1. The gas turbine engine shown in FIG. 1 is generally designated by the numeral 10. Fuel supply to the gas turbine engine 10 is provided by the fuel controller 12 that meters fuel to the gas turbine engine combustion chambers 14.

A control 16 provides signals to the fuel controller 12 during gas turbine engine 10 start-up regulating metering of fuel supply for assuring sufficient turbine acceleration. The control 16 prevents the fuel controller from supplying excessive fuel to the gas turbine engine 10 during start-up and causing over temperature operation with possible turbine stall. The control 16 may be implemented in diverse forms including analog and/or digital circuitry.

To achieve metering of fuel during gas turbine engine 10 start up, the control 16 receives as an input at least a rotational speed signal from the turbine spool 18 of the gas turbine engine 10. Providing a rotational speed signal for a gas turbine engine 10 turbine spool 18 is known, and the details are not shown here. In addition to using the turbine spool 18 rotational speed signal the control 16 also takes the time derivative of this rotational speed signal to obtain a turbine spool 18 rotational acceleration signal.

The turbine spool 18 rotational speed and rotational acceleration signals provided to the control 16 allow using the present invention to dynamically regulate scheduling of fuel metering from the fuel controller 12 to the gas turbine engine 10. Such dynamic scheduling of fuel metering is achieved by adjusting the gas turbine engine 10 to the low limit of metered fuel required for start-up as a function of turbine spool 18 rotational speed. The objective is to have the low limit of metered fuel approach as close as possible the minimum quantity of fuel needed for acceleration while avoiding flameout. This minimum fuel quantity data is stored in the memory 20. When the gas turbine engine 10 is started-up, the rotational speed signal from the turbine spool 18 provides an input to the control 16. In response to the rotational speed signal, control 16 accesses the memory 20 and obtains the corresponding low limit value for the sensed speed regulating the amount of metered fuel for the measured turbine spool 18 rotational speed. The low limit value for regulating the amount of metered fuel is provided by the control 16 to the fuel controller 12.

The low limit of metered fuel may be adjusted as the turbine spool 18 rotational speed increases in accordance with minimum fuel design data stored in the memory 20 with no further canonical reconciliation of fuel metering being used. The described initial fuel metering adjustment is dependent on changes in turbine spool 18 rotational speed and presumes both that changes are due to increases in rotational speed and that such changes are at an appropriate rate. Increases in rotational speed at appropriate rates may not occur as desired for proper gas turbine engine 10 start-up. According to the present invention, acceptable rates of increase in turbine spool 18 rotational speed can be assured by having the control 16 continuously calculate a correction term for further adjusting quantities of fuel metered by fuel controller 12.

Calculation of the correction term begins with the control 16 taking the first time derivative of the turbine spool 18 rotational speed signal to obtain the rotational acceleration signal. At the beginning of gas turbine engine 10 start-up the correction term is fixed by the control 16 at zero. Fuel metered from fuel controller 12 to combustion chambers 14 at the beginning of the gas turbine engine 10 start up is burned and applies torque to turbine spool 18. The amount of metered fuel is determined by the control 16 obtaining the low limit values from the memory 20 beginning with the stored low limit value for the initial rotational speed at which fuel is to be provided to the combustion chambers 14. The correction term is initially zero. Then the rotational acceleration is calculated. If the calculated rotational acceleration for the turbine spool 18 is below a predetermined threshold value for the sensed speed, also stored in memory 20, then the initial correction term is increased in value and inputted to the control 16. Using this initial inputted value for the correction term, the control 16 regulates the fuel controller 12. This regulation increases metered fuel which provides increased torque to the turbine spool 18 causing rotational acceleration to increase. If the turbine spool 18 rotational acceleration does not increase so as to be comparable with the predetermined threshold value, then the correction term value is again increased to meter additional fuel to the combustion chambers 14. Step increasing of the correction term value during start-up can be applied repeatedly up to a predetermined maximum value dependent on rotational speed of the turbine spool 18.

The correction term is fine tuned from start-up from the stored estimates to achieve values nearer the optimum fuel metering values for the actual sensed starting conditions. The stored fuel metering values have been biased toward the lean side of a anticipated acceleration fuel requirement in the most critical starting region where failure in starting is likely to occur.

Predetermined threshold values for rotational acceleration as stored in the memory 20 can be determined by gas turbine engine 10 design as the low limit values. Thus, when the control 16 interrogates the memory 20, upon having a rotational speed input, both a low limit value for metering fuel and a predetermined threshold value for rotational acceleration are provided for the value of turbine spool 18 rotational speed. Further, initial correction term values, an incremental step value for increasing the initial correction term values, and maximum correction term values are stored in the memory 20. These also are functions of turbine spool 18 rotational speed and are provided to control 16. The maximum correction term value is set such that temperatures from burning fuel in the gas turbine engine 10 cannot cause damage.

A second embodiment of the present invention, additionally stores in the memory 20 turbine spool 18 maximum rotational acceleration as a function of rotational speed. These maximum values for rotational acceleration are provided to the control 16 for comparison with calculated rotational accelerations based upon the sensed speed to determine if rotational acceleration of turbine spool 18 has excessively increased. Excessive rotational acceleration would not be identified in the first embodiment where only qualitative determinations of exceeding a predetermined threshold value of turbine spool 18 rotational acceleration is made. When comparison of measured rotational acceleration with stored maximum value of rotated acceleration determines comparable values, the control 16 step reduces the correction term provided to the fuel controller.

A third embodiment of the present invention uses gas turbine engine 10 measured exhaust gas temperature (EGT) to further control metering of fuel. Here a temperature sensor 22, as known in the art, is used to provide a signal to control 16 which is proportional to EGT. The control 16 is used to control the metering of fuel by comparing actual EGT with a maximum EGT in terms of the actual EGT being less than or greater than the maximum EGT as a consequence of detecting when the actual EGT is equal to the maximum EGT.

Rather than simply blocking additional increases in the fuel correction term when the actual EGT exceeds the maximum EGT, it is desirable to reduce the fuel correction term by subtracting one incremental step from the correction term. This results in testing first to determine if the actual EGT has been exceeded and then testing to determine if the acceleration is below a desired level when the EGT does not exceed the limit.

For the third embodiment, the control 16 receives both the turbine spool 18 rotational speed signal and the EGT signal. The control 16 receives the rotational speed signal from the sensor 18 and the low limit value for adjusting fuel controller 12 and the predetermined threshold rotational acceleration value are received from the memory 20. When the predetermined threshold rotational acceleration value exceeds the calculated rotational acceleration value, a correction term value is provided to the fuel controller 12. In the third embodiment, the maximum value of the correction term is limited using the EGT signal. A comparison is made between measured EGT and predetermined EGT, stored in memory 20. If the measured EGT is less than the stored predetermined EGT and the measured turbine spool rotational acceleration is less than the predetermined threshold value which is also stored in memory 20, the maximum correction term value can be incrementally increased up to the value where the fuel controller 12 provides the maximum fuel quantity such that measured EGT corresponds to the maximum stored EGT value. Step increasing of the correction term value during start-up can be applied repeatedly up to a predetermined maximum value dependent on rotational speed of the turbine spool. If the measured EGT is greater than the stored predetermined EGT, the incremental increasing of the correction term value ceases which avoids excess supply of fuel.

The above discussion and related illustration of the present invention are directed primarily to preferred embodiments and practices of the invention. However, numerous changes and modifications in the actual implementation of described concepts will be apparent to those skilled in the art, and changes and modifications may be made without departing from the scope of the invention as defined by the following claims.

I claim:

1. A fuel controller for a gas turbine engine comprising:
   a fuel control for providing metered fuel to the gas turbine engine in response to a fuel control signal;
   a rotational speed measuring device for determining a rotational speed of the gas turbine engine;
   a memory for storing control parameters used during start-up of the gas turbine engine; and
   a control responsive to a sensed speed and the control parameters stored in the memory for providing the fuel control signal to the fuel control for controlling the metering of fuel by the fuel controller applied to the gas turbine with a functional control relationship between a quantity of fuel which is metered by the fuel controller and the rotational speed of the gas turbine engine being varied during the start-up; and wherein
   control parameters utilized by the control in generating the control signal are varied from the stored control parameters during start-up to vary the functional control relationship, and low limit fuel values applied to the control from the memory, which are a function of a sensed initial rotational speed, are provided to the gas turbine engine from the fuel controller beginning with a stored low limit value for an initial rotational speed at which fuel is provided to the gas turbine engine, a calculated rotational acceleration for the turbine is provided by the control for the sensed initial rotational speed and compared with a threshold value stored in memory with an initial value of a correction term being applied to the control from the memory if the calculated acceleration is below the stored acceleration to which the calculated acceleration is compared to cause a change in the control signal to ensure metered fuel flow to the gas turbine engine.

2. A fuel control in accordance with claim 1 wherein:

the rotational acceleration of the turbine is calculated by the control after the initial value of the correction term is applied to the control from the memory to cause an increase in metered fuel and compared with a stored threshold value and if the rotational acceleration has not increased the control increases the correction term by addition of a step value to the correction term to cause an increase in metered fuel flow to the gas turbine engine.

3. A fuel control in accordance with claim 2 wherein: the correction term is increased in steps during start-up by the control up to a maximum value stored in the memory to which the calculated correction term is compared during start-up which is a function of rotational speed of the turbine.

4. A fuel control system in accordance with claim 1 wherein:
the memory stores a maximum rotational acceleration of the gas turbine engine as a function of speed; and
the control compares the maximum acceleration with a calculated acceleration for the sensed speed to determine if acceleration of the gas turbine is exceeding a limit and if the calculated acceleration is exceeding the limit the control decreases the correction term to cause a reduction in the metered fuel provided to the gas turbine.

5. A fuel control system in accordance with claim 2 wherein:
the memory stores a maximum rotational acceleration of the gas turbine engine as a function of speed; and
the control compares the maximum acceleration with a calculated acceleration for the sensed speed to determine if acceleration of the gas turbine is exceeding a limit and if the calculated acceleration is exceeding the limit the control decreases the correction term to cause a reduction in the metered fuel provided to the gas turbine.

6. A fuel control system in accordance with claim 3 wherein:
the memory stores a maximum rotational acceleration of the gas turbine engine as a function of speed; and
the control compares the maximum acceleration with a calculated acceleration for the sensed speed to determine if acceleration of the gas turbine is exceeding a limit and if the calculated acceleration is exceeding the limit the control decreases the correction term to cause a reduction in the metered fuel provided to the gas turbine.

7. A fuel control in accordance with claim 1 further comprising:
an exhaust gas sensor for sensing exhaust gas temperature from the gas turbine engine; and wherein
the control, responsive to sensed exhaust gas temperature, calculates the correction term as a function of a sensed exhaust gas temperature, and if the measured exhaust gas temperature is greater than a maximum stored exhaust gas temperature, an increase of the correction term is stopped.

8. A fuel control in accordance with claim 2 further comprising:
an exhaust gas sensor for sensing exhaust gas temperature from the gas turbine engine; and wherein
the control, responsive to sensed exhaust gas temperature, calculates the correction term as a function of a sensed exhaust gas temperature, and if the measured exhaust gas temperature is greater than a maximum stored exhaust gas temperature, an increase of the correction term is stopped.

9. A fuel control in accordance with claim 3 further comprising:
an exhaust gas sensor for sensing exhaust gas temperature from the gas turbine engine; and wherein
the control, responsive to sensed exhaust gas temperature, calculates the correction term as a function of a sensed exhaust gas temperature, and if the measured exhaust gas temperature is greater than a maximum stored exhaust gas temperature, an increase of the correction term is stopped.

10. A fuel control in accordance with claim 4 further comprising:
an exhaust gas sensor for sensing exhaust gas temperature from the gas turbine engine; and wherein
the control, responsive to sensed exhaust gas temperature, calculates the correction term as a function of a sensed exhaust gas temperature, and if the measured exhaust gas temperature is greater than a maximum stored exhaust gas temperature, an increase of the correction term is stopped.

11. A fuel control in accordance with claim 5 further comprising:
an exhaust gas sensor for sensing exhaust gas temperature from the gas turbine engine; and wherein
the control, responsive to sensed exhaust gas temperature, calculates the correction term as a function of a sensed exhaust gas temperature, and if the measured exhaust gas temperature is greater than a maximum stored exhaust gas temperature, an increase of the correction term is stopped.

12. A fuel control in accordance with claim 6 further comprising:
an exhaust gas sensor for sensing exhaust gas temperature from the gas turbine engine; and wherein
the control, responsive to sensed exhaust gas temperature, calculates the correction term as a function of a sensed exhaust gas temperature, and if the measured exhaust gas temperature is greater than a maximum stored exhaust gas temperature, an increase of the correction term is stopped.

* * * * *